US012717318B2

(12) United States Patent
Sreedharan et al.

(10) Patent No.: US 12,717,318 B2
(45) Date of Patent: Aug. 25, 2026

(54) COMPLEMENTARY ARCHITECTURE FOR VERIFYING INPUT DATA IN REDUNDANT MODULES

(71) Applicant: Rockwell Automation Asia Pacific Business Center Pte. Ltd., Singapore (SG)

(72) Inventors: Rosh Chathoth Sreedharan, Singapore (SG); Samuel Too, Singapore (SG); Yungang Wang, Singapore (SG); Xiaofan Chen, Singapore (SG); Takashi Hanai, Aichi (JP)

(73) Assignee: Rockwell Automation Asia Pacific Business Center Pte. Ltd., Singapore (SG)

( * ) Notice: Subject to any disclaimer, the term of this patent is extended or adjusted under 35 U.S.C. 154(b) by 456 days.

(21) Appl. No.: 18/231,115

(22) Filed: Aug. 7, 2023

(65) Prior Publication Data

US 2024/0160201 A1 May 16, 2024

Related U.S. Application Data

(60) Provisional application No. 63/383,367, filed on Nov. 11, 2022.

(51) Int. Cl.
*G05B 23/02* (2006.01)

(52) U.S. Cl.
CPC ....... *G05B 23/0221* (2013.01); *G05B 23/024* (2013.01)

(58) Field of Classification Search
None
See application file for complete search history.

(56) References Cited

U.S. PATENT DOCUMENTS

| | | | | |
|---|---|---|---|---|
| 6,704,682 | B2 * | 3/2004 | Summers | G05B 9/03 702/50 |
| 7,515,492 | B2 * | 4/2009 | Seo | G11C 5/14 365/207 |
| 8,032,234 | B2 * | 10/2011 | Foss | G05B 23/0232 700/110 |

(Continued)

*Primary Examiner* — Elias Mamo
(74) *Attorney, Agent, or Firm* — Fletcher Yoder, P.C.

(57) ABSTRACT

A system includes a first converter configured to receive a first signal and convert the first signal into a second signal. The system also includes a second converter configured to receive the first signal and convert the first signal into a third signal. The system also includes a control system configured to perform a verification operation on the second signal based on the third signal. The control system is also configured to perform a first diagnostic operation on the first converter during a first duration of time. The control system is also configured to perform a second diagnostic operation on the second converter during a second duration of time. The first duration of time and the second duration of time occur at different time periods. The control system is also configured to receive first complement data from the second converter during the first duration of time. The control system is also configured to receive second complement data from the first converter during the second duration of time. The control system is also configured to generate a fourth signal based on the second signal, the third signal, the first complement data, and the second complement data.

20 Claims, 7 Drawing Sheets

(56) References Cited

U.S. PATENT DOCUMENTS

| | | | | |
|---|---|---|---|---|
| 9,379,884 | B2 * | 6/2016 | Ciacci | H04L 7/0334 |
| 10,790,844 | B2 * | 9/2020 | Ferre Fabregas | H03M 1/1205 |
| 11,573,105 | B2 * | 2/2023 | Granig | G01D 18/00 |

* cited by examiner

99
SAFETY ANALOG INPUT MODULE
ANALOG SISGNAL
154
ANALOG - TO - DIGITAL CONVERTER
150A
160A
D
DEAD TIME
221
ANALOG - TO - DIGITAL CONVERTER
150B
160B
DEAD TIME
227
156A
156B
MICROCONTROLLER UNIT
152A
NO DATA
MICROCONTROLLER UNIT
152B
NO DATA
225
BACK PLANE COMMUNICATION ASIC
162
164
166

COMPLEMENTARY ARCHITECTURE FOR VERIFYING INPUT DATA IN REDUNDANT MODULES

CROSS-REFERENCE TO RELATED APPLICATION

This application claims priority to and the benefit of U.S. Patent Application No. 63/383,367, entitled "COMPLEMENTARY ARCHITECTURE FOR VERIFYING INPUT DATA IN REDUNDANT MODULES", filed Nov. 11, 2022, which is herein incorporated by reference in its entirety for all purposes.

BACKGROUND

The present disclosure relates generally to safety systems in an industrial automation system. More specifically, the disclosure is related to verifying input data received at certain equipment that includes redundant circuit architecture or components.

In an industrial automation system, a safety analog input module may be included as part of a distributed control system and may receive signals from one or more field devices. The safety analog input module may include an analog-to-digital converter used for converting an analog signal received from a field device to a digital signal compatible with the distributed control system. In order to verify that the safety analog input module is functioning properly, it may be desired to perform a diagnostics operation on the safety analog input module.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a system includes a first converter configured to receive a first signal and convert the first signal into a second signal. The system also includes a second converter configured to receive the first signal and convert the first signal into a third signal. The system also includes a control system configured to perform a verification operation on the second signal based on the third signal. The control system is also configured to perform a first diagnostic operation on the first converter during a first duration of time. The control system is also configured to perform a second diagnostic operation on the second converter during a second duration of time. The first duration of time and the second duration of time occur at different time periods. The control system is also configured to receive first complement data from the second converter during the first duration of time. The control system is also configured to receive second complement data from the first converter during the second duration of time. The control system is also configured to generate a fourth signal based on the second signal, the third signal, the first complement data, and the second complement data.

In another embodiment, a method includes converting a first signal into a second signal via a first converter. The method also includes converting the first signal a third signal via a second converter. The method also includes performing a first verification operation on the second signal based on the third signal. The method also includes performing a second verification operation on the third signal based on the second signal. The method also includes performing a first diagnostic operation on the first converter during a first duration of time. The method also includes performing a second diagnostic operation on the second converter during a second duration of time. The first duration of time and the second duration of time occur at different time periods. The method also includes generating a fourth signal based on a portion of the second signal and an additional portion the third signal. The portion of the second signal excludes a first dataset that corresponds to the first duration of time. The additional portion of the third signal excludes a second dataset that corresponds to the second duration of time.

In another embodiment, a system includes a first analog-to-digital converter configured to receive a first analog signal and convert the first analog signal into a second digital signal. The system also includes a second analog-to-digital converter configured to receive the first analog signal and convert the first analog signal into a third digital signal. The system also includes a control system configured to perform a verification operation on the second digital signal based on the third digital signal. The control system is also configured to perform a first diagnostic operation on the first analog-to-digital converter during a first duration of time. The control system is also configured to perform a second diagnostic operation on the second analog-to-digital converter during a second duration of time. The first duration of time and the second duration of time occur at different time periods. The control system is also configured to disregard a first dataset from the first analog-to-digital converter during the first duration of time. The control system is also configured to receive first complement data from the second analog-to-digital converter during the first duration of time. The control system is also configured to receive second complement data from the first analog-to-digital converter during the second duration of time. The control system is also configured to generate a fourth digital signal based on the second digital signal, the third digital signal, the first complement data, and the second complement data.

BRIEF DESCRIPTION OF THE DRAWINGS

These and other features, aspects, and advantages of the present disclosure may become better understood when the following detailed description is read with reference to the accompanying drawings in which like characters represent like parts throughout the drawings, wherein.

DETAILED DESCRIPTION

Figure 1:
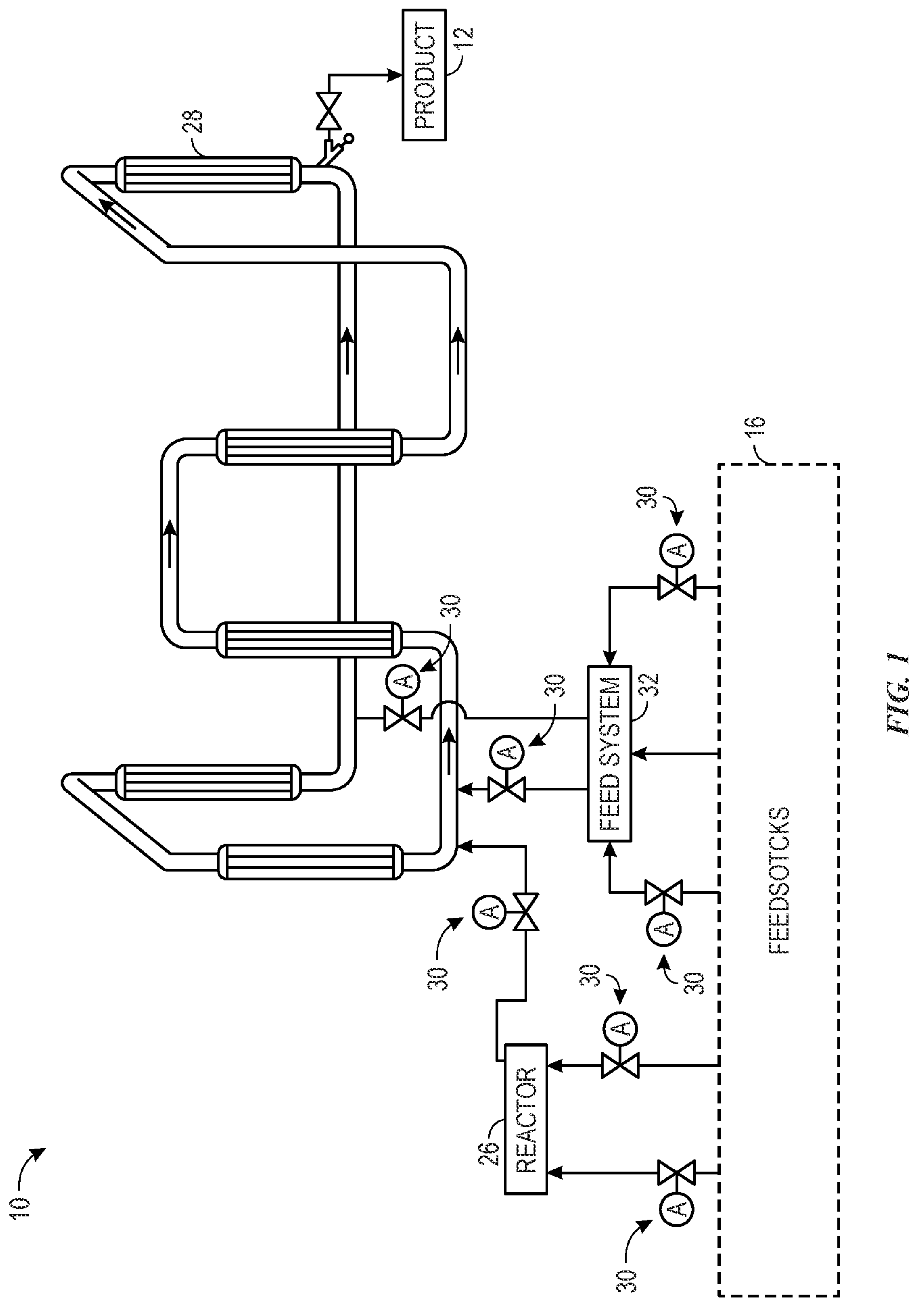
FIG. 1 is a diagrammatic representation of an example process, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiment of the present disclosure, the articles "a," "an," "the," and "said" are intended to mean that there are one or more of these elements. The terms "comprising," "including," and "having" are intended to be inclusive and mean that there may be additional elements other than the listed elements.

Input/output (I/O) modules or components may receive input data, such that the input data is analyzed and verified in a redundant manner to ensure that the received input data is accurate. Indeed, for industrial systems that are categorized as having a hardware fault tolerance (HFT) of 1, the I/O modules disposed therein may not be allowed to tolerate more than one failure or discrepancy. With this in mind, certain I/O modules (e.g., safety input module) may include redundant circuit components (e.g., analog-to-digital (ADC) circuitry, microcontroller) to compare the data analyzed or processed using the same input data. For instance, a safety analog input module may receive an analog signal and process the analog signal with parallel sets of components, such that each parallel set of components includes ADC converters that convert the analog signal into digital signals and a microcontroller (MCU) that compares the digital signals acquired by another ADC circuitry to verify that there are no discrepancies between the two sets of digital signals.

In some instances, noise or other signals embedded in the analog input signal, such as communication data (e.g., HART), may interfere with the analysis performed by the components of the I/O module. The embedded signal may result in lowered accuracy and increased error rates in the analyzed data. As such, the parallel sets of components may verify that the converted or analyzed data is accurate by comparing the similarly processed data with each other.

With this in mind, it may be beneficial to perform diagnostic operations on certain components, such as the ADC circuitry. For example, the ADC circuitry may inaccurately convert the analog signal into an incorrect digital signal because one or more channels or parts of the ADC component becomes corrupted, due to electro-magnetic noise present in the area, or the like. As such, a diagnostic test that provides a diagnostic signal that transitions from low to high, or vice versa, may be performed to verify the accuracy of the ADC circuitry. Indeed, a selector switch may switch between the analog signal and the diagnostic signal to confirm that the ADC circuitry is accurately detecting the high and low values. In this way, the ADC circuitry may be diagnosed with changing analog input channels. For example, the ADC circuitry may scan full or zero-scale signals to detect whether the ADC circuitry is inaccurately reading a signal (e.g., stuck fault).

However, when performing the diagnostic operation, the parallel ADC circuit components within the I/O module may not provide output data to any connected components. That is, the I/O module may have dead time (e.g., absence of received data) in which the analog input data may not be processed. This dead time may be longer than some threshold amount of time (e.g., safety reaction time (SRT)) that may be acceptable to components that receive data from the I/O module.

With the foregoing in mind, in some embodiments, the diagnostic signal may be provided to each ADC component of each parallel set of components at different times to avoid dead times. That is, a first diagnostic signal may be provided to a first ADC component for a duration that is less that the threshold amount of time (e.g., SRT). After the first diagnostic signal is transmitted to the first ADC component and the analog signal is provided again to the first ADC component, the second ADC component may receive the diagnostic signal. In the same way, the second ADC component may receive the second diagnostic signal for another duration that is again less than the threshold amount of time. As a result, the microcontroller may consistently receive at least one of the two analog signals to forward to connected devices during diagnostic testing operations.

In some cases, performing the diagnostic operations via two ADC components may cause the resulting processed signals to become unsynchronized with respect to each other. In other words, the diagnostic operation performed on the first ADC component may introduce a delay that is different from the diagnostic operation performed on the second ADC component. In this situation, the microcontroller may compare different digital values that are not representative of the same converted analog signal, thereby resulting in erroneous comparisons.

With this in mind, in some embodiments, the microcontroller may measure a first amount of time in which the diagnostic operations are performed for the first ADC component and a second amount of time in which the diagnostic operations are performed for the second ADC component. After determining the two amounts of time, the microcontroller may include an additional delay in one of the two outputs of one of the two ADC converters to allow the two outputs to become synchronized again.

By performing the techniques described above, the I/O module may provide accurate processed data, while maintaining a redundant fail-safe system. Additionally, the reduction in stagnation of the output signal due to the parallel configuration of the first and second ADC components may reduce noise of the output signal. In addition, although the embodiments described herein are detailed as being performed with ADC components and microcontrollers, it should be understood that the embodiments described herein may be performed for other suitable circuit components and control systems.

By way of introduction, FIG. 1 is a diagrammatic representation of an industrial process in which embodiments described below may be implemented. In particular, illustrated is an example system 10. However, it should be noted that the discussion set forth below is intended to be applicable, as appropriate, to any petrochemical process, industrial process, manufacturing process, or the like, as a way to provide context to the following discussion of FIGS. 2-7.

Production processes, like the reactor process shown in FIG. 1, may occur on an ongoing basis as part of a continuous operation to generate products (e.g., product 12). Sometimes a variety of both continuous and batch systems may be employed throughout a production process. Various suppliers may provide feedstocks 16 to the reactor system 10 via pipelines, trucks, cylinders, drums, and so forth. Feedstocks 16 may change when using different manufacturing processes and/or when manufacturing a different final product. The system 10 may include one or more types of manufacturing processes.

Each of the feedstocks 16, reactor 26, and/or feed system 32 may use different operating parameters to create suitable output intermediate products for use in subsequent reactions or as a product output. Operating parameters of the reactor system 10 may include temperature, pressure, flow rate, mechanical agitation, product takeoff, component concentrations, polymer production rate, and so forth, and one or more may be selected on to achieve the desired polymer properties. Controlling temperature may include using a gas burner, an electrical heating conduit, a heat exchange device 28, or the like, to increase or reduce the temperature of intermediate products of the reactor system 10. As an example, during operation, a cooling fluid may be circulated within the cooling jackets of the heat exchange devices 28 as needed to remove the generated heat and to maintain the temperature within the desired range.

Figure 2:
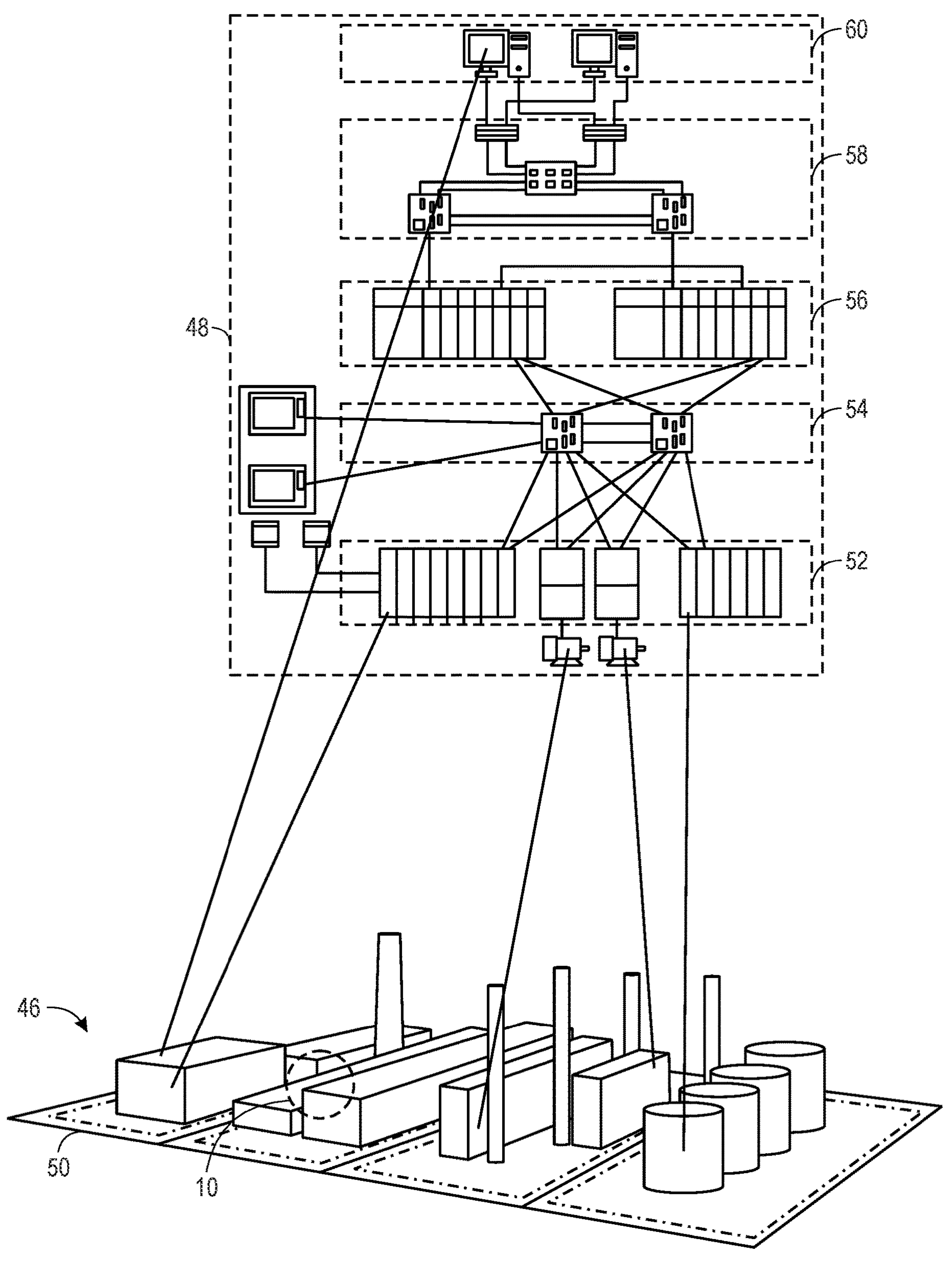
FIG. 2 is an illustration of an industrial automation system that includes a distributed control system (DCS), in accordance with an embodiment.

Feedstock 16 flow rates, control of operating parameters, and the like, may be managed by a control system (e.g., like the control system shown in FIG. 2). The control system may generate control signals, for example, control signals that are transmitted to one or more actuators 30 to cause the actuator to open or close (or partially open or partially close) as a way to control operating parameters of the feedstock 16, control of other operating parameters, and the like.

With the foregoing in mind, the components of the reactor system 10 may be connected to power supplies, power supply conditions, and other systems that enable the components to be highly available. Moreover, it should be noted that the present embodiments described herein may be implemented in a variety of industrial environments and should not be limited to the reactor system 10 described above.

Referring now to FIG. 2, FIG. 2 is an illustration of an example industrial automation system 46 that includes a distributed control system 48 (e.g., a "DCS"). The industrial automation system 46 may include the system 10 from FIG. 1 and/or any number of industrial automation components.

Industrial automation components may include a user interface, the distributed control system 48, a motor drive, a motor, a conveyor, specialized original equipment manufacturer machines, fire suppressant system, and any other device that may enable production or manufacture products or process certain materials. In addition to the aforementioned types of industrial automation components, the industrial automation components may also include controllers, input/output (IO) modules, motor control centers, motors, human-machine interfaces (HMIs), user interfaces, contactors, starters, sensors, drives, relays, protection devices, switchgear, compressors, network switches (e.g., Ethernet switches, modular-managed, fixed-managed, service-router, industrial, unmanaged), and the like. The industrial automation components may also be related to various industrial equipment such as mixers, machine conveyors, tanks, skids, specialized original equipment manufacturer machines, and the like. The industrial automation components may also be associated with devices used in conjunction with the equipment such as scanners, gauges, valves, and the like. In one embodiment, every aspect of the industrial automation component may be controlled or operated by a single controller (e.g., control system). In another embodiment, the control and operation of each aspect of the industrial automation components may be distributed via multiple controllers (e.g., control system).

The industrial automation system 46 may divide logically and physically into different units 50 corresponding to cells, areas, factories, subsystems, or the like of the industrial automation system 46. The industrial automation components (e.g., load components, processing components) may be used within a unit 50 to perform various operations for the unit 50. The industrial automation components may be logically and/or physically divided into the units 50 as well to control performance of the various operations for the unit 50.

The distributed control system 48 may include computing devices with communication abilities, processing abilities, and the like. For example, the distributed control system 48 may include processing modules, a control system, a programmable logic controller (PLC), a programmable automation controller (PAC), or any other controller that may monitor, control, and operate an industrial automation device or component. The distributed control system 48 may be incorporated into any physical device (e.g., the industrial automation components) or may be implemented as a stand-alone computing device (e.g., general purpose computer), such as a desktop computer, a laptop computer, a tablet computer, a mobile device computing device, or the like. For example, the distributed control system 48 may include many processing devices logically arranged in a hierarchy to implement control operations by disseminating control signals, monitoring operations of the industrial automation system 46, logging data as part of historical tracking operations, and so on.

In an example distributed control system 48, different hierarchical levels of devices may correspond to different operations. A first level 52 may include input/output communication modules (IO modules) to interface with industrial automation components in the unit 50. A second level 54 may include control systems that control components of the first level and/or enable intercommunication between components of the first level 52, even if not communicatively coupled in the first level 52. A third level 56 may include network components, such as network switches, that support availability of a mode of electronic communication between industrial automation components. A fourth level 58 may include server components, such as application servers, data servers, human-machine interface servers, or the like. The server components may store data as part of these servers that enable industrial automation operations to be monitored and adjusted over time. A fifth level 60 may include computing devices, such as virtual computing devices operated from a server to enable human-machine interaction via an HMI presented via a computing device. It should be understood that levels of the hierarchy are not exhaustive and nonexclusive, and thus devices described in any of the levels may be included in any of the other levels. For example, any of the levels may include some variation of an HMI.

One or more of the levels or components of the distributed control system 48 may use and/or include one or more processing components, including microprocessors (e.g., field programmable gate arrays, digital signal processors, application specific instruction set processors, programmable logic devices, programmable logic controllers), tangible, non-transitory, machine-readable media (e.g., memory such as non-volatile memory, random access memory (RAM), read-only memory (ROM), and so forth. The machine-readable media may collectively store one or more sets of instructions (e.g., algorithms) in computer-readable code form, and may be grouped into applications depending on the type of control performed by the distributed control system 48. In this way, the distributed control system 48 may be application-specific, or general purpose.

Furthermore, portions of the distributed control system 48 may include an open loop control system (e.g., does not use feedback for control), a closed loop control system (e.g., uses feedback for control), or a combination of both open and closed system components and/or algorithms. Further, in some embodiments, the distributed control system 48 may utilize feed forward inputs.

Each of the levels 52, 54, 56, 58, 60 may include component redundancies, which may help provide a high availability control system. For example, within the first level, redundant and concurrently operating backplanes may provide power to each of the IO modules.

Figure 3:
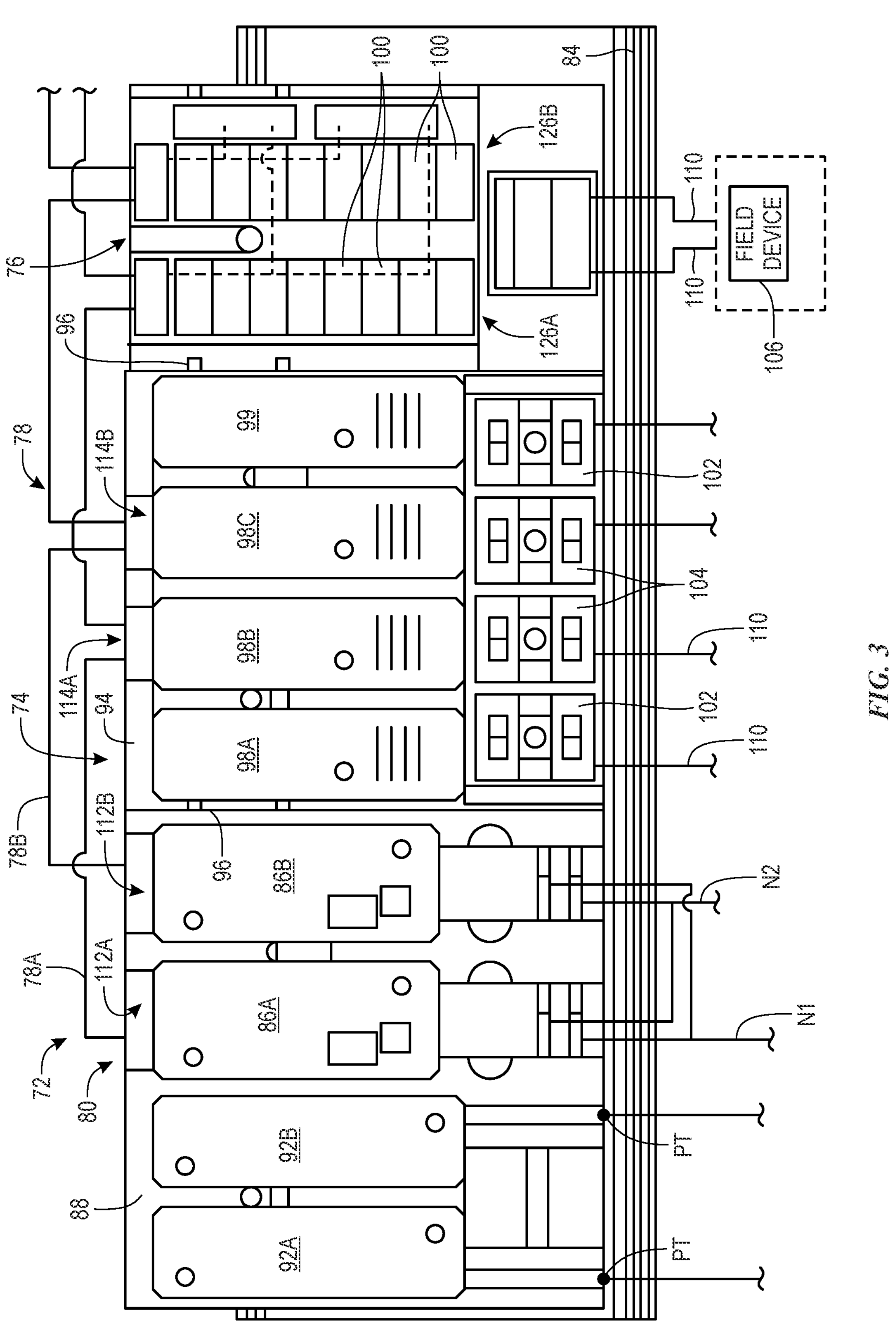
FIG. 3 is an illustration of a distributed modular input/output (IO) system, in accordance with an embodiment.

To elaborate, FIG. 3 is an illustration of a distributed modular IO system 72 associated with the distributed control system 48 of FIG. 2. The distributed modular IO system 72 may include IO devices 74, an IO module 76 and backplanes 78 (78A, 78B). The distributed modular IO system 72 may include a network adapter 80 having two or more adapter modules 86 (86A, 86B).

The network adapter 80 may be coupled to at least one industrial automation network N1, N2. The first and second redundant industrial automation networks N1, N2 may be Parallel Redundancy Protocol (PRP) LAN networks, Ethernet/IP networks, or other industrial automation networks so that the network adapter 80 may receive data from, transmits data to, and otherwise communicates with one or more industrial control modules, control systems, processing circuitry, or the like, such as one or more programmable logic controllers (PLC), microprocessors, and/or other electronic processors for machine and/or process control.

The network adapter 80 may include first and second identical or otherwise redundant adapter modules 86 (86A, 86B) operating in parallel with each other. The redundant adapter modules 86 may each be releasably connected to the adapter base 88. Each of the adapter modules 86 may be operably connected to both the first and second networks N1, N2 by connections in the adapter base 88. The adapter modules 86 may also include electronic circuitry to communicate data with circuitry coupled to the networks N1, N2, with IO devices 74, or with other interconnected components.

The network adapter 80 may include first and second media landing modules 90 (90A, 90B) removably coupled to the first and second adapter modules 86 through the adapter base 88. The media landing boards 90 may each include at least two network connectors NC, such as RJ45 connectors, Small FormFactor Pluggable (SFP) connectors, optical fiber connectors, or the like. The industrial networks N1, N2 may be coupled to the media landing boards 90 via the network connectors NC, and thus be connected to the adapter modules 86 though the media landing boards 90.

The IO device 74 redundant power conditioning and supplying IO modules (power conditioners) 92 (92A, 92B), which may be coupled to the adapter base 88 and may include a power input terminal PT. The power input terminal PT may be used when connecting with at least one source of electrical power, such that the power conditioners 92 may supply system electrical power to the network adapter 80 via the adapter base 88, as well as to other components coupled to the backplane 78. As shown herein the power input terminals PT are removably connected to the adapter base 88 and are operably connected to the power conditioners 92 through the adapter base 88.

The IO device 74 may include a base 94 also mounted to the support rail 84 or another support structure. The base 94 may be located adjacent to base 82. The base 94 may be operably, physically, and/or electrically connected to another base via multi-contact electrical connectors 96 such that the backplane 78 may power and communicate between the network adapter 80, IO devices 74, the industrial networks N, and the like. FIG. 3 shows the backplane 78 as being external to the IO device 74, but those of ordinary skill in the art will recognize that the backplane 78 circuit or network is physically and electrically constructed within and extends through printed circuit boards and other circuitry located in the bases 88 and bases 94 via the electrical connectors 96.

The IO device 74 may include IO processing modules (TO modules) 98 (98A, 98B, 98C). The IO modules 98 may be removably connected to the base 94 in respective mounting slots via electrical connections, such that each of the IO modules 98 may be operatively coupled to the backplane 78. The IO modules 98 may use the backplane 78 to communicate with the network adapter 80, the other IO (sub) modules 98, 100, and the like. The IO device 74 may also include a safety analog input module 99. In one embodiment, at least two of the IO modules 98 are identical to each other and operated in parallel with each other to provide a redundancy with respect to each other.

The base 94 may include at least one terminal block 102, which may include cage clamps, spring clamps, screw terminals, or other wiring connectors 104 that are adapted to be connected to field cables or field wiring 110 that are each associated with a field device 106. The field device 106 may be an analog or digital device such as a sensor, flow meter, switch, probe, thermocouple, RTD, encoder, or the like, and the field device 106 may receive input data or transmit output data via the terminal blocks 102.

The network adapter 80 may include independent "adapter" Ethernet switches 112 (112A, 112B), which may be operably connected to, form part of, and establish the backplane 78. Similarly, the IO devices 74 may include independent IO module Ethernet switches 114 (114A, 114B) that may be operably connected to, form part of, and establish the backplane 78. The switches 112 and the switches 114 may be identical but are numbered differently to facilitate description of their operation. The switches 112, 114 may perform a packet switching operation to direct data communication of any suitable backplane network/protocol.

The IO module 76 may be a single-channel IO device that includes one or more removable and replaceable single-channel IO submodules 100. The IO module 76 may include a base adapted for mounting on a support rail 84 or another support structure. The base may include multi-contact electrical connectors 96 to form a portion of the backplanes 78. The IO module 76 may include a terminal block connected to the base. The terminal block may include wiring connectors that couple the terminal block to other industrial automation components. The IO module 76 may include Ethernet switches, each operably coupled to, form part of, and establish the backplane 78.

The IO module 76 may include at least two configurable IO modules 126 (126A, 126B). The configurable IO modules 126 may each be defined by and include separate IO segments or IO submodules 100, which may each be selectively installed on and removable from the base. The configurable IO modules 126 may define a group of the IO submodules 100. In this example, the configurable IO modules 126 each include eight, single-channel IO submodules 100, and thus include eight individual IO data channels.

The IO submodules 100 and/or the IO modules may include electronic circuitry to perform a particular type of data input/output (IO) operation, such as a direct current (DC) input, DC output, alternating current (AC) input, AC output, safety input/output, highway addressable remote transducer protocol (HART) input/output, real time data (RTD) and/or thermocouple input and/or output, or other analog or digital input/output for data and signals. Each IO submodules 100 and/or the IO modules may be respectively used for different types of data communication. Furthermore, each IO submodules 100 and/or the IO modules may be associated with a single, dedicated IO data channel operably coupled to a group of one or more wiring connectors of the terminal block (e.g., column of wiring connectors). In this way, a field device coupled to the one or more wiring connectors may be associated with a particular IO data channel and may be operably connected to the corresponding IO submodule 100 associated with the same IO data channel. As noted above, the IO submodules 100 and/or the IO modules may be selected to be the appropriate IO type (e.g., analog, digital, AC input, AC output, DC input, DC output) as required for the particular field device connected to its associated IO data channel.

Figure 4:
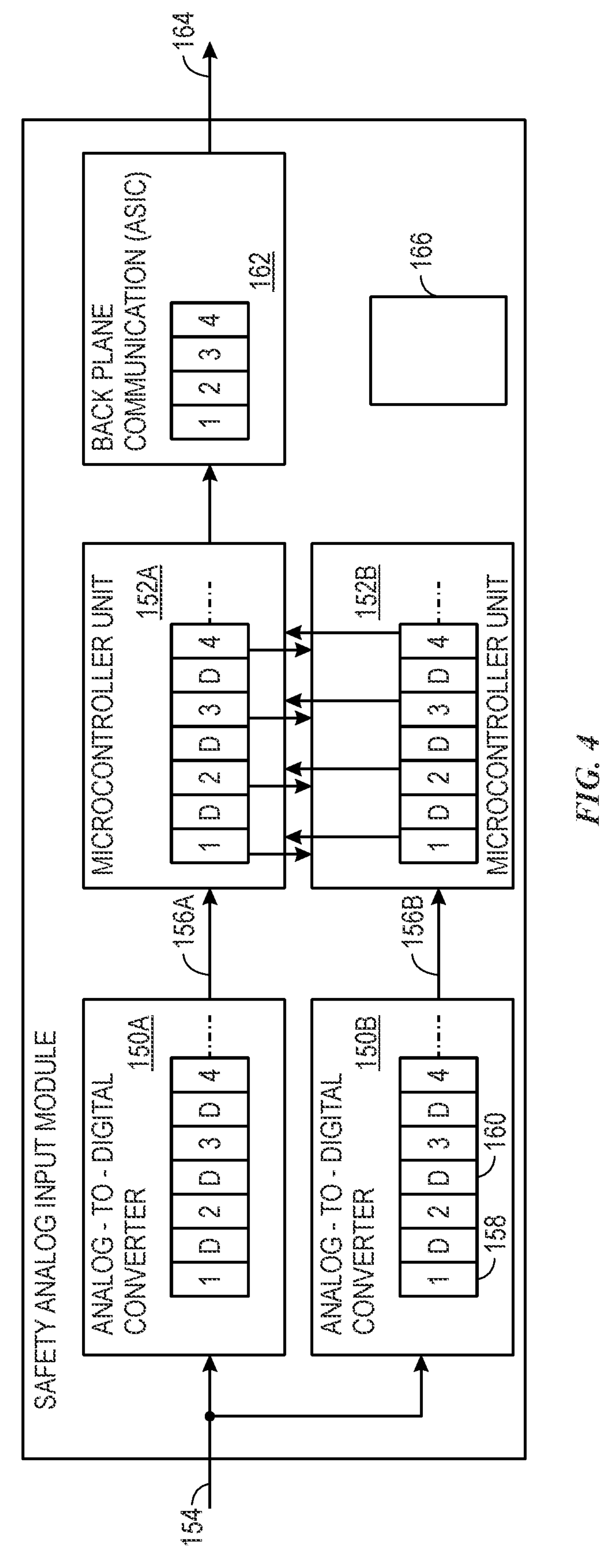
FIG. 4 is an illustration of a safety analog input module used in the distributed modular input/output (IO) system of FIG. 3, in accordance with an embodiment.

FIG. 4 is an illustration of the safety analog input module 99 that may be used in the distributed modular IO system of FIG. 3. As shown, the safety analog input module 99 includes the analog-to-digital converters 150 (150A, 150B) communicatively coupled to the microcontroller units 152 (152A, 152B). In the illustrated embodiment, the safety analog input module 99 receives an analog signal 154 (e.g., input signal, analog input signal, etc.). The analog signal 154 is sent to the analog-to-digital converter 150A and the analog-to-digital converter 150B, where the analog signal 154 is converted to digital signals 156A and 156B, respectively. The digital signals 156 are comprised of bits 158. The bits 158 include diagnostic bits 160, as described in further detail herein. The digital signals 156A and 156B are transmitted to the microcontroller units 152A and 152B, respectively. The microcontroller units 152 may compare the digital signals 156A and 156B (e.g., perform a verification operation) to each other. For example, the microcontroller units 152 may compare corresponding bits of the digital signals 156A and 156B. The microcontroller unit 152A may subsequently transmit the digital signal 156A to a back plane communication application-specific integrated circuit (ASIC) 162, which may output the digital signal 156A from the safety analog input module 99 as an output signal 164 to other components of the distributed modular IO system and/or devices external to the distributed modular IO system. The safety analog input module 99 may also include a processing system 166 that may control the analog-to-digital converters 150 and the microcontroller units 152. In certain embodiments, the microcontroller units 152 (e.g., microcontroller units 152A and 152B) may control the analog-to-digital converters 150 in place of the processing system 166.

Figure 5:
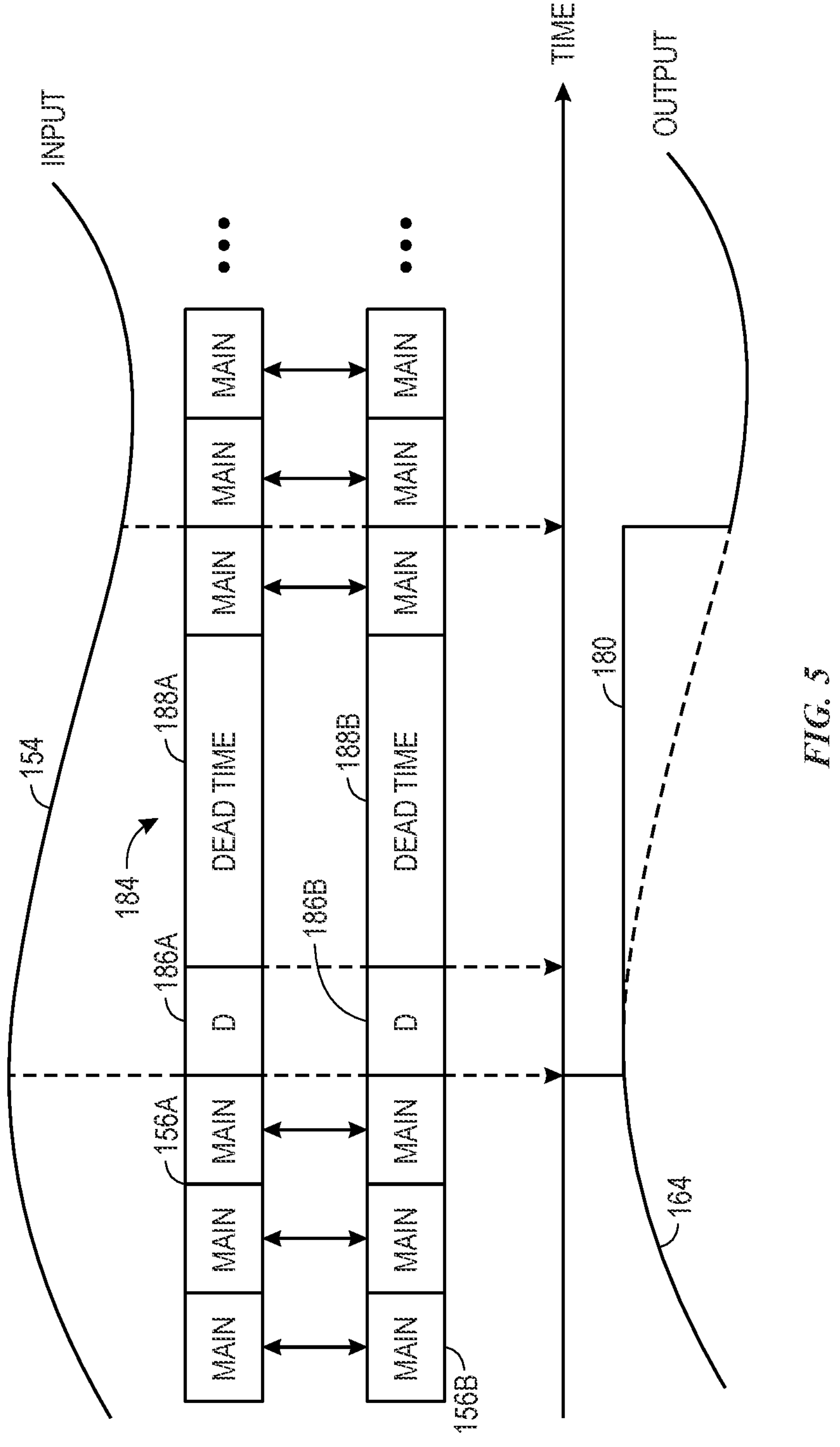
FIG. 5 is an illustration of an interruption in an output signal of the safety analog input module due to a diagnostic operation of the safety analog input module, in accordance with an embodiment.

FIG. 5 is an illustration of an interruption 180 in an output signal 164 of the safety analog input module due to a diagnostic operation 184 being executed on the safety analog input module 99. As shown, the analog signal 154 is converted to digital signals 156A and 156B. At some point in time, an operator may desire to run the diagnostic operation 184 on the safety analog input module 99. In certain embodiments, the diagnostics operation 184 may include diagnostic bits 160 (160A and 160B) provided to the analog-to-digital converters 150. The diagnostics operation 184 may be used for detection of a stuck fault via changing a channel of each of the analog-to-digital converters 150. As shown, the diagnostics bits 160 result in dead times 188 (188A and 188B) in the digital signals 156A and 156B, respectively, due to the diagnostic operations taking place, the settling time of the analog-to-digital converters 150, and the like. The dead times 188 occur in a time interval starting at the reception of the first diagnostic bit 160 and extending for a duration of time. The concurrent dead times 188A and 188B result in a stagnation (e.g., interruption, delay, lag, etc.) of the output signal 164 during the time interval of the dead times 188.

Figure 6:
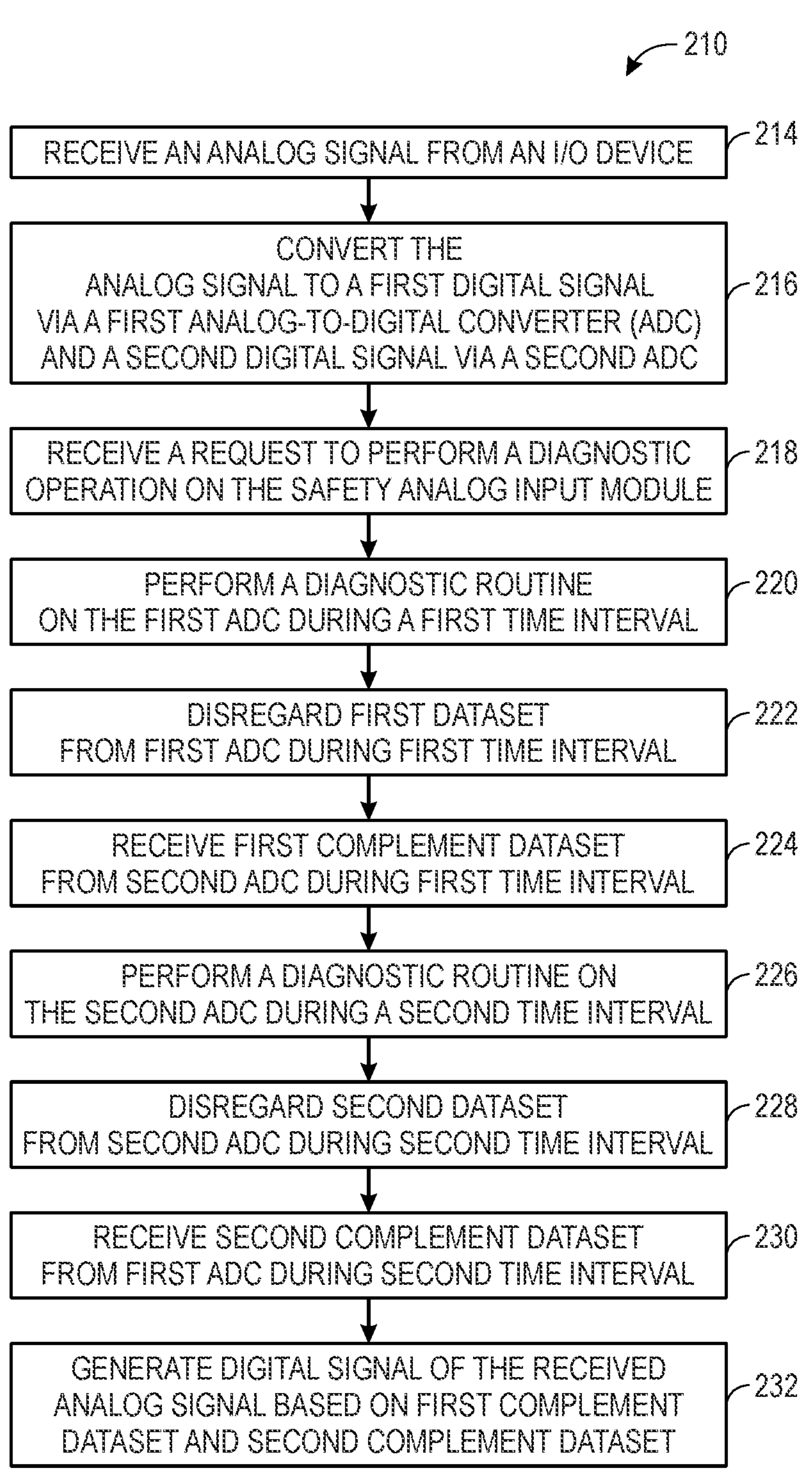
FIG. 6 is a flow chart of a method for increasing the update rate of the output signal of the safety analog input module during diagnostic operations, in accordance with an embodiment.

Keeping this in mind, FIG. 6 illustrates a flow chart of a method 210 for increasing the update rate of the output signal 164 of the safety analog input module 99 during the diagnostic operations 184. Although the following description is detailed as being performed by the safety analog input module 99 (e.g., via a processing system 166 and/or the microcontroller units 152), it should be noted that any suitable processing system may perform the method 210. Further, although the method 210 is described as being performed in a particular order, it should be understood that the method 210 may be performed in any suitable order. The safety analog input module 99 shown in FIG. 7 will be used for the purpose of describing the method 210.

Referring now to FIG. 6, at block 214, the safety analog input module 99 may receive the analog signal 154 from a field device (e.g., field IO device). For example, the field device may include a sensor (e.g., proximity sensor, thermocouple, pressure sensor, etc.) configured to output an analog signal indicative of a measurement.

In block 216, the safety analog input module 99 may convert the analog signal 154 to the digital signal 156A via the analog-to-digital converter 150A, and concurrently convert the analog signal 154 to the digital signal 156B via the analog-to-digital converter 150B. It should be understood that the analog-to-digital converters 150 may be considered as functionally equivalent. That is, the analog-to-digital converters 150 may be assumed to operate at the same rate, such that any difference in performance of the analog-to-digital converters 150 may be considered negligible. In certain embodiments, the safety analog input module 99 may be configured to convert the analog signal 154 to two or more digital signals 156.

In block 218, the safety analog input module 99 (e.g., via the processing system 166 and/or the microcontroller units 152) may receive a request to perform the diagnostic operation 184 on the safety analog input module 99. For example, an operator may send a request to the safety analog input module 99 to perform the diagnostic operation 184 as part of a routine inspection. In certain embodiments, the diagnostic operation 184 may be performed intermittently by a controller at set time intervals.

In block 220, the safety analog input module 99 may receive instructions from the processing system 166 to perform the diagnostic operation on the analog-to-digital converter 150A during a first time interval 221. It should be understood that the first time interval 221 may include, in addition to the duration of the diagnostic operation, an expected settling time of the analog-to-digital converter 150A after completion of the diagnostic operation. In certain embodiments, the duration of the first time interval 221 may extend past an end of the expected settling time analog-to-digital converter 150A. In certain embodiments, the duration of the first time interval 221 may be less than a threshold amount of time (e.g., SRT).

In block 222, the safety analog input module 99 may disregard the digital signal 156A (e.g., dataset portion of the digital signal 156A) from the analog-to-digital converter 150A during the first time interval 221. In certain embodiments, the processing system 166 may instruct the safety analog input module 99 to disregard the digital signal 156A for a duration of time that extends beyond the first time interval 221 to account for a variance in the duration of the diagnostic operation and/or the expected settling time of the analog-to-digital converter 150A thereafter.

In block 224, the safety analog input module 99 may receive a complement dataset 225 from the analog-to-digital converter 150B (e.g., via transmission of the digital signal 156B) during the first time interval 221. It should be noted that the complement dataset 225 received from the analog-to-digital converter 150B may correspond to the expected data that would otherwise be output via the digital signal 156A without performance of the diagnostic routine 160A.

In block 226, the safety analog input module 99 may perform the diagnostic operation on the analog-to-digital converter 150B during a second time interval 227 (e.g., via instructions received from the processing system 166). It should be understood that the second time interval 227 may include, in addition to the duration of the diagnostic operation, an expected settling time of the analog-to-digital converter 150B after completion of the diagnostic operation as described above. In certain embodiments, the duration of the second time interval 227 may extend past an end of the expected settling time analog-to-digital converter 150B. In certain embodiments, the duration of the second time interval 227 may be less than a threshold amount of time (e.g., SRT). The second time interval 227 is different than (e.g., disjoint from) the first time interval 221. That is, there is no overlap between the first time interval 221 and the second time interval 227.

In block 228, the safety analog input module 99 may disregard the digital signal 156B (e.g., dataset portion of the digital signal 156B) from the analog-to-digital converter 150B during the second time interval 227. In certain embodiments, the processing system 166 may instruct the safety analog input module 99 to disregard the digital signal 156B for a duration of time that extends beyond the second time interval 227 to account for a variance in the duration of the diagnostic routine 160B and/or the settling time of the analog-to-digital converter 150B thereafter. As a result, in block 230, the safety analog input module 99 may receive a second complement dataset from the analog-to-digital converter 150A during the second time interval 227.

In block 232, the safety analog input module 99 may generate the output signal 164 based on the complement dataset 225. For example, the safety analog input module 99 may output the digital signal 156A which includes the complement dataset 225 during the first time interval 221.

Figure 7:
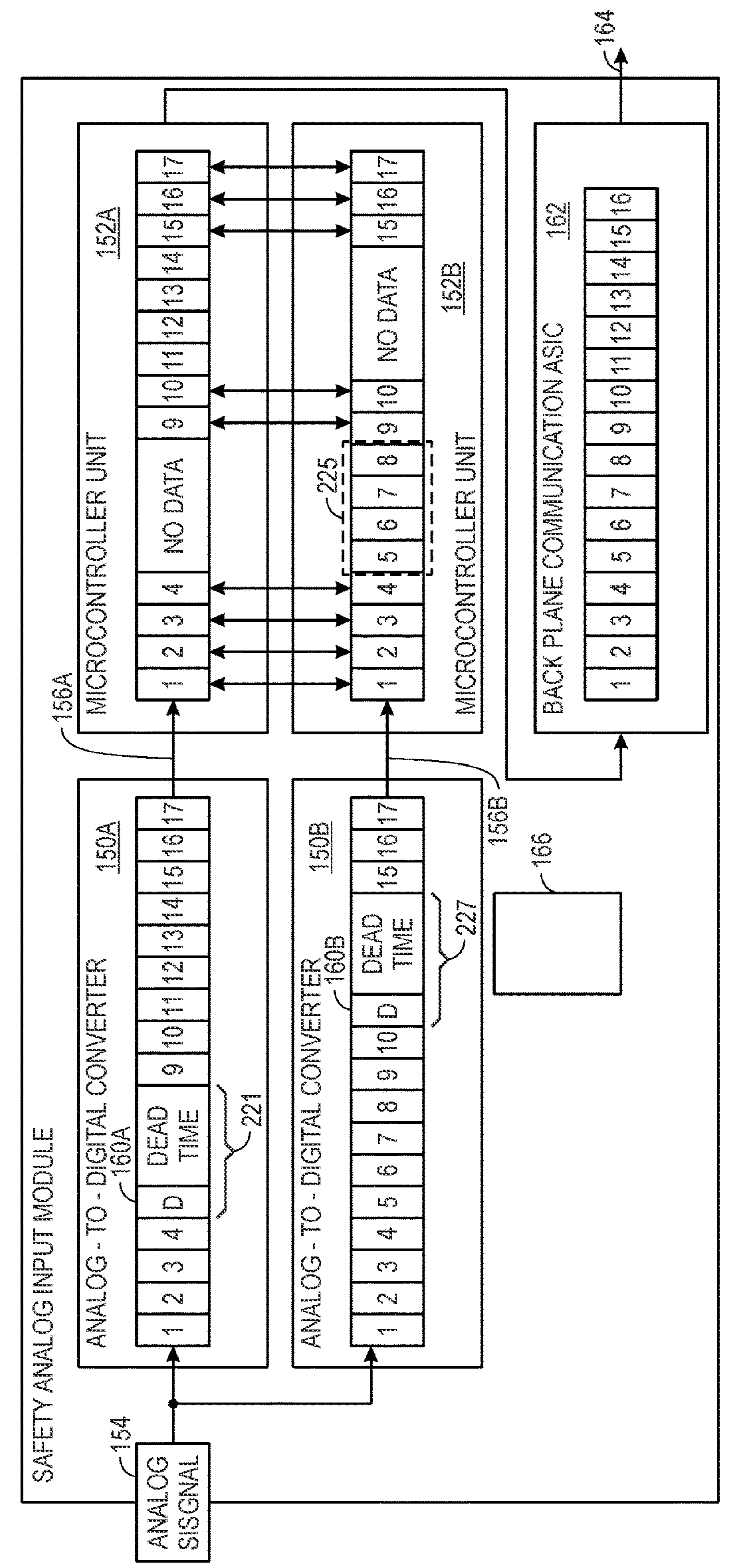
FIG. 7 is an illustration of the safety analog input module performing the diagnostic operation, in accordance with an embodiment of the present disclosure.

With the foregoing in mind, FIG. 7 is an illustration of the safety analog input module 99 performing a diagnostic operation 184. It should be noted that the actions described herein taken by the safety analog input module 99 are executed as a result of instructions stored in the processing system 166 of the safety analog input module 99. As shown, the safety analog input module 99 receives the analog signal 154 as an input signal, which is sent to analog-to-digital converters 150A and 150B. The analog-to-digital converters 150A and 150B convert the analog signal 154 to digital signals 156A and 156B, respectively. In response to receiving a request (e.g., from an operator) to perform the diagnostic operation 184, the safety analog input module 99 receive the diagnostic bit 160A via the analog-to-digital converter 150A during the first time interval 221, and receives the diagnostic bit 160B via the analog-to-digital converter 150B during the second time interval 227. As discussed herein, the first time interval 221 and the second time interval 227 are different from each other and do not overlap. It should be noted that the first time interval 221 may occur before the second time interval 227, or vice versa.

As shown, the digital signals 156A and 156B are sent to microcontroller units 152A and 152B, respectively. The microcontroller units 152 are configured to compare the digital signals 156A and 156B (e.g., corresponding bits) when neither the first time interval 221 nor the second time interval 227 is occurring. That is, the microcontroller units 152 may not compare the digital signals 156 during either the first time interval 221 or the second time interval 227. As shown, during the first time interval 221, the microcontroller unit 152A may be configured to disregard the digital signal 156A and receive the complement dataset 225 from the analog-to-digital converter 150B (e.g., via transmission of a portion of the digital signal 156B). As shown, the safety analog input module 99 may compare the digital signal 156A with the digital signal 156B during portions of the digital signals 156 that fall outside either the first time interval 221 and the second time interval 227. After the digital signal 156A receives the complement dataset 225 from the digital signal 156B, the microcontroller unit 152A transmits the digital signal 156A to the back plane communication ASIC 162, which may output the digital signal 156A as the output signal 164. In certain embodiments, the processing system 166 may control the source of the output signal 164. For example, during the first time interval 221, the processing system 166 may cause the complement dataset 225 to be output by the microcontroller unit 152A while disregarding the digital signal 156A.

In certain embodiments, the digital signal 156A and/or the digital signal 156B may be delayed for a short duration of time due to configuration of the analog-to-digital converters 150A and 150B, to perform the diagnostic operations, respectively. In certain embodiments, the delays in each of the digital signals 156 may be different from each other. The safety analog input module 99 may realign the digital signals 156A and 156B when the digital signals are unsynchronized by changing a duration of a diagnostics operations. For example, if the delay in the digital signal 156B exceeds the delay in the digital signal 156A, the safety analog input module 99 may shorten the duration of the diagnostics routine 160B, lengthen the duration of the diagnostics routine 160A, or both to synchronize the digital signals 156A and 156B. Additionally and/or alternatively, if the delay in the digital signal 156A exceeds the delay in the digital signal 156B, the safety analog input module 99 may be shorten the duration of the diagnostics routine 160A, lengthen the duration of the diagnostics routine 160B, or both to synchronize the digital signals 156A and 156B.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the present disclosure have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A system, comprising:

a first converter configured to receive a first signal and convert the first signal into a second signal;

a second converter configured to receive the first signal and convert the first signal into a third signal;

a control system configured to:

perform a verification operation on the second signal based on the third signal;

perform a first diagnostic operation on the first converter during a first duration of time;

perform a second diagnostic operation on the second converter during a second duration of time, wherein the first duration of time and the second duration of time occur at different time periods;

receive first complement data from the second converter during the first duration of time;

receive second complement data from the first converter during the second duration of time; and generate a fourth signal based on the second signal, the third signal, the first complement data, and the second complement data.

2. The system of claim 1, wherein the control system is configured to refrain from performing the verification operation during the first duration of time and the second duration of time.

3. The system of claim 1, wherein the control system is configured to:

in response to detecting a delay in the second signal with respect to the third signal, adjust the first duration of time, the second duration of time, or both.

4. The system of claim 1, wherein the first duration of time, the second duration of time, or both is shorter than a threshold duration of time.

5. The system of claim 1, wherein the first duration of time is greater than a first expected settling time of the first converter, the second duration of time is greater than a second expected settling time of the second converter, or both.

6. The system of claim 1, wherein the system comprises:

a first microcontroller unit configured to receive the second signal from the first converter; and a second microcontroller unit configured to receive the third signal from the second converter.

7. The system of claim 6, wherein the first microcontroller unit is configured to:

output the fourth signal to a communication application-specific integrated circuit (ASIC).

8. A method, comprising:

converting a first signal into a second signal via a first analog-to-digital converter (ADC) circuit;

converting the first signal a third signal via a second ADC circuit;

performing a first verification operation on the second signal based on the third signal via a first microcontroller unit;

performing a second verification operation on the third signal based on the second signal via a second microcontroller unit;

performing a first diagnostic operation on the first ADC circuit during a first duration of time;

performing a second diagnostic operation on the second ADC circuit during a second duration of time, wherein the first duration of time and the second duration of time occur at different time periods; and generating a fourth signal based on a portion of the second signal and an additional portion the third signal, wherein the portion of the second signal excludes a first dataset that corresponds to the first duration of time, and wherein the additional portion of the third signal excludes a second dataset that corresponds to the second duration of time.

9. The method of claim 8, comprising foregoing the first and second verification operations during the first duration of time and the second duration of time.

10. The method of claim 8, comprising:

detecting a delay in the second signal with respect to the third signal; and adjusting the first duration of time, the second duration of time, or both based on the delay.

11. The method of claim 10, wherein the first duration of time is lengthened or shortened to cause the second signal and the third signal to synchronize.

12. The method of claim 8, wherein the first duration of time, the second duration of time, or both is shorter than a safety reaction time.

13. The method of claim 8, wherein the first duration of time is greater than a first settling time of the first ADC circuit, the second duration of time is greater than a second settling time of the second ADC circuit, or both.

14. The method of claim 13, comprising sending the fourth signal to a communication application-specific integrated circuit (ASIC).

15. A system, comprising:

a first analog-to-digital converter configured to receive a first analog signal and convert the first analog signal into a second digital signal;

a second analog-to-digital converter configured to receive the first analog signal and convert the first analog signal into a third digital signal;

a control system configured to:

perform a verification operation on the second digital signal based on the third digital signal;

perform a first diagnostic operation on the first analog-to-digital converter during a first duration of time;

perform a second diagnostic operation on the second analog-to-digital converter during a second duration of time, wherein the first duration of time and the second duration of time occur at different time periods;

disregard a first dataset from the first analog-to-digital converter during the first duration of time;

receive first complement data from the second analog-to-digital converter during the first duration of time;

receive second complement data from the first analog-to-digital converter during the second duration of time; and generate a fourth digital signal based on the second digital signal, the third digital signal, the first complement data, and the second complement data.

16. The system of claim 15, wherein the control system is configured to refrain from performing the verification operation during the first duration of time and the second duration of time.

17. The system of claim 15, wherein the control system is configured to:

in response to detecting a delay in the second digital signal with respect to the third digital signal, adjust the first duration of time, the second duration of time, or both.

18. The system of claim 15, wherein the first duration of time, the second duration of time, or both is shorter than a threshold duration of time.

19. The system of claim 15, wherein the first duration of time is greater than a first expected settling time of the first analog-to-digital converter, the second duration of time is greater than a second expected settling time of the second analog-to-digital converter, or both.

20. The system of claim 15, wherein the system comprises:

a first microcontroller unit configured to receive the second digital signal from the first analog-to-digital converter; and a second microcontroller unit configured to receive the third digital signal from the second analog-to-digital converter.

* * * * *